United States Patent [19]
Galonska

[11] 3,867,910
[45] Feb. 25, 1975

[54] ENGINE CONSTRUCTION AND OPERATING METHOD UTILIZING EXHAUST GAS AS A SOURCE OF ENERGY

[76] Inventor: Walter Galonska, 164 E. 87th St., New York, N.Y. 10028

[22] Filed: Mar. 27, 1973

[21] Appl. No.: 345,321

[52] U.S. Cl............ 123/8.13, 123/8.09, 123/119 A
[51] Int. Cl............................................. F02b 53/10
[58] Field of Search............. 123/8.09, 8.13, 119 A; 60/278, 901; 417/159

[56] References Cited
UNITED STATES PATENTS

| | | | |
|---|---|---|---|
| 1,202,331 | 10/1916 | Tatom | 123/119 A |
| 1,377,535 | 5/1921 | White | 123/119 A |
| 2,114,548 | 4/1938 | Stadlman | 123/119 A |
| 3,168,078 | 2/1965 | Lamm | 123/8.13 |
| 3,703,163 | 11/1972 | Lamm | 123/8.09 |
| 3,762,376 | 10/1973 | Eberle et al. | 123/8.09 X |

Primary Examiner—William L. Freeh
Assistant Examiner—Michael Koczo, Jr.
Attorney, Agent, or Firm—Steinberg and Blake

[57] ABSTRACT

A method and structure for adjustable charging of internal combustion engines for the purpose of increasing compression and preparing a fuel-air mixture, utilizing exclusively exhaust gases (which are recirculated) as an energy source for supply of air and air compression, instead of expensive charging compressors.

3 Claims, 7 Drawing Figures

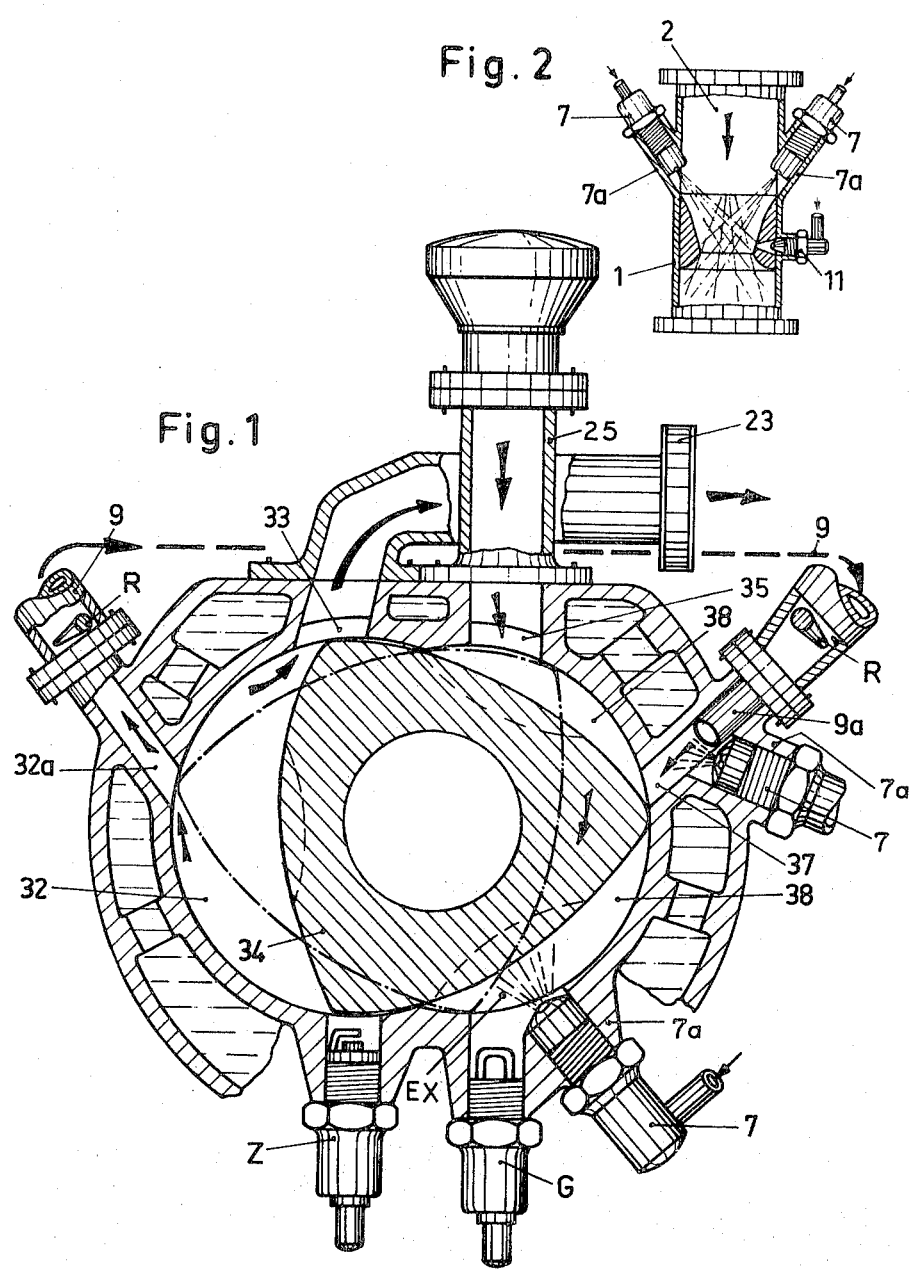

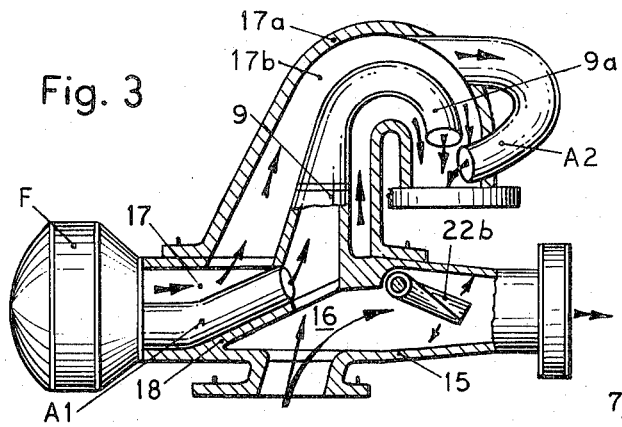
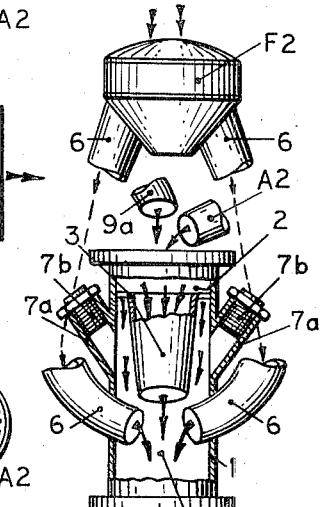
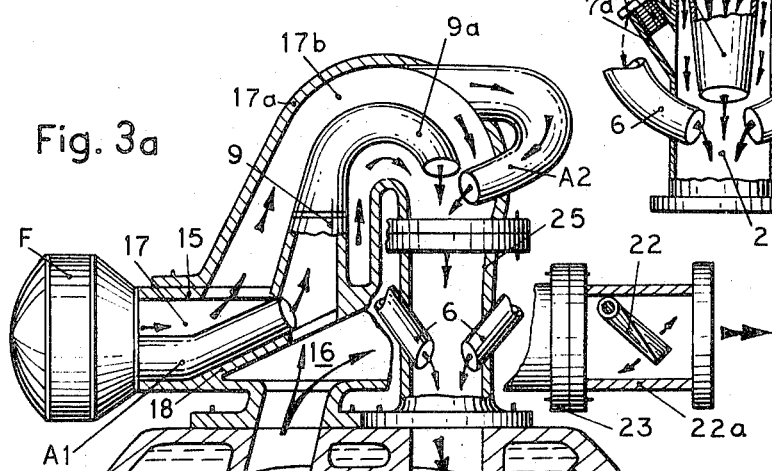
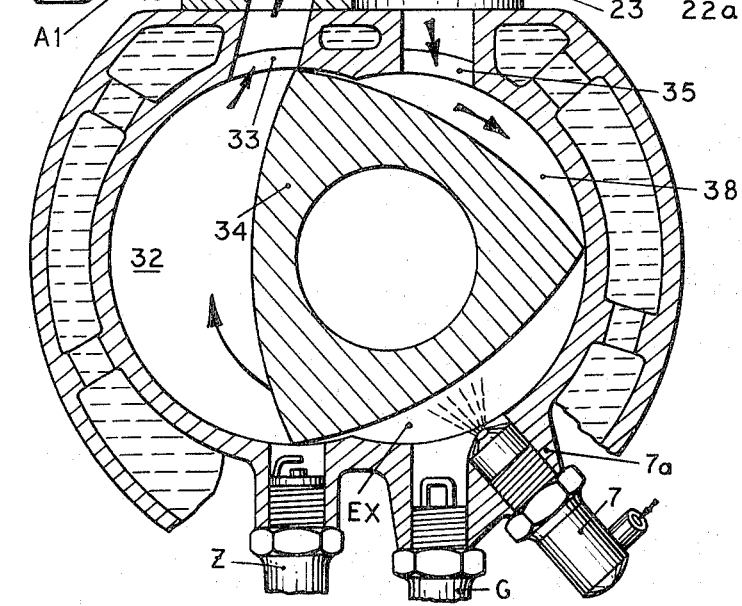
Fig. 3  Fig. 3b  Fig. 3a

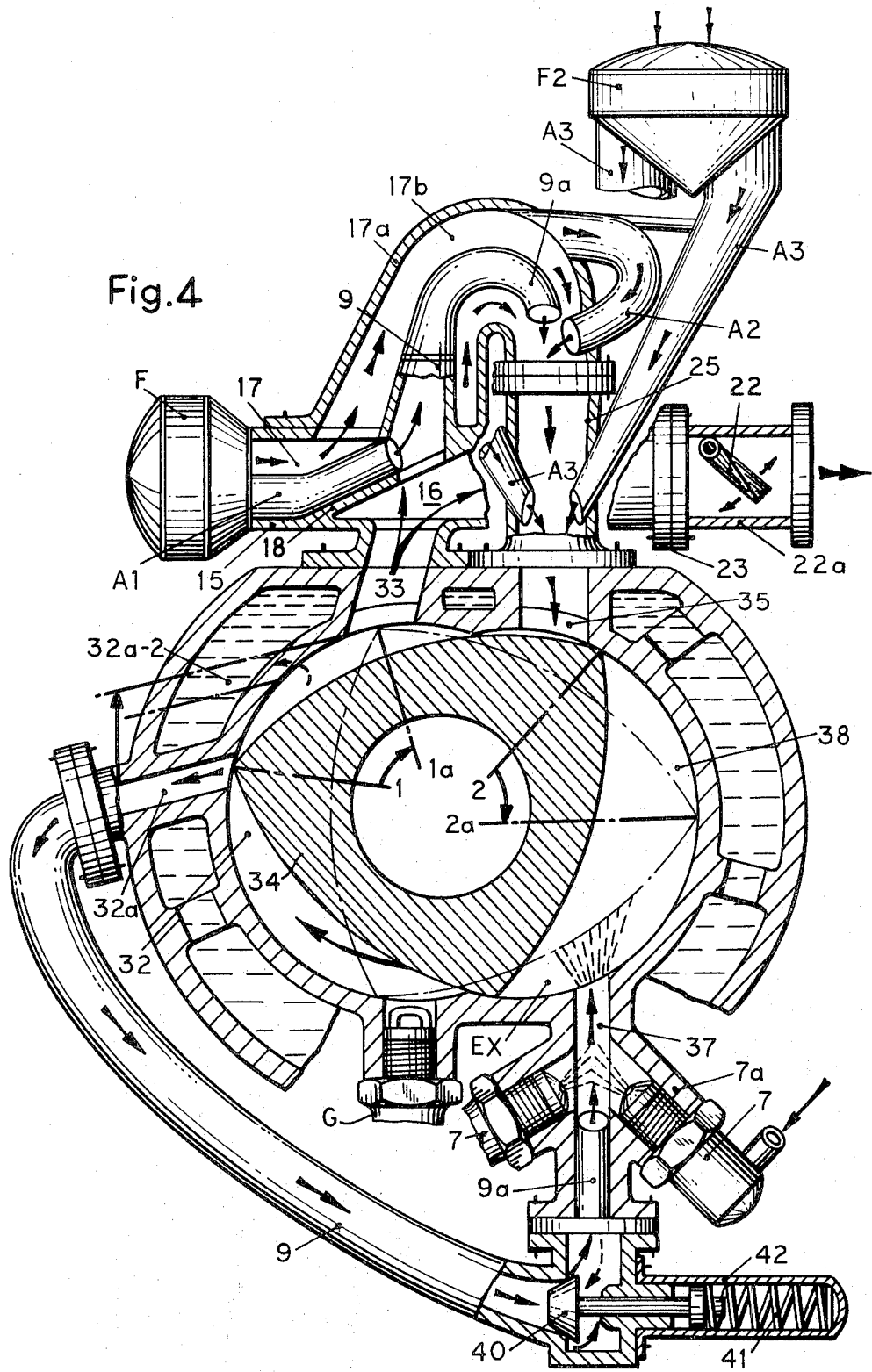

ENGINE CONSTRUCTION AND OPERATING METHOD UTILIZING EXHAUST GAS AS A SOURCE OF ENERGY

BACKGROUND OF THE INVENTION

It is already known to charge a rotary piston Wankel engine by means of extremely expensive and power-consuming compressors which have special supply and exhaust passages which are controlled by way of the rotary piston in connection with the supply and exhaust to the compressor and to the receiving chamber of the engine. Such constructions are little suited for automobiles, particularly in city traffic, since at low rotation speeds of the engine no charging remains present and with further increase in the speed of rotation the extent of discharge of pollutants to the outer atmosphere with the exhaust gas is increased enormously.

It is possible to place the fuel in a usable condition by utilizing compressed air, but with this type of procedure there is always the requirement of an air compressor and the efficiency is therefore reduced since the thermal efficiency with the vibratory motion of hot air is lacking.

SUMMARY OF THE INVENTION

It is accordingly a primary object of the present invention to provide an engine construction and operating method according to which it becomes possible to utilize as a source of energy for air compression and fuel-preparation purposes only the exhaust gases, so that it is no longer necessary to use expensive compressors for this purpose with all of the drawbacks resulting therefrom.

Thus, according to the present invention, a much better charging and a much better air supply and air compression are achieved if use is made with a Wankel engine of the exhaust gases which flow at high speed and have a high temperature as well as vibratory motion of the hot air, for the purpose of supplying air and compressing air, so that a Wankel engine can be operated, if desired, with Diesel oil, although this latter result has not yet been possible with conventional engines.

Thus, it is an object of the present invention to provide an engine construction and operating method according to which it becomes possible to operate an engine such as a Wankel engine with Diesel oil.

In addition, it is an object of the present invention to provide an engine construction and operating method which make it possible to treat the fuel which is supplied by way of the exhaust gas which flows at high speed and which may be mixed with air in such a way that it becomes possible to provide a finer and more thoroughly atomized combustible mixture at each revolution than is possible with carburetors and injection nozzles.

It is also an object of the present invention to provide an engine construction and method which make it possible to reduce the extent to which pollutants are discharged to the outer atmosphere with the exhaust gas. Thus, if part of the exhaust gas is directed to an optimum extent to the combustion air or to the mixture of fuel and air and supplied to the intake chamber of the combustion engine, the extent to which pollutants are freed to the outer atmosphere is reduced considerably.

For charging purposes it is possible to use compressed air together with part of the exhaust gas, to be supplied to the intake chamber of the internal combustion engine, with the speed of flow of the fuel for a purpose of atomization being required to be higher than the speed of flow of the compressed or non-compressed combustion air supplied by way of a carburetor or even with fuel injection.

Thus, with a Wankel engine according to the invention the fuel mixture preparation in the fuel supply system and also at the closed intake chamber is treated by addition of exhaust gas or a mixture of air and exhaust gas so as to increase the compression enabling operation with Diesel oil.

In order to carry out charging of a Wankel engine a pair of additional passages are required, first at the exhaust chamber and then at the region of the intake chamber. Both passages are connected with an exhaust gas-overflow passage. Both of these additional passages are controlled by the rotary piston in connection with exhaust and supply. By arranging exchangeable nozzles at the mouths of the additional passages it is possible to supply to the intake chamber an amount of exhaust gas which has an optimum accurate relationship with respect to the combustion air or with respect to the combustion air mixture in order to achieve any necessary or desired increase in compression.

In the case where the intake chamber has been closed it is possible in this way to utilize the part of the exhaust gas which is supplied primarily to increase the compression ratio, inasmuch as the added exhaust gas enters into the intake chamber which is already under compression, remaining therein for the most part as a compact mass without having any undesirable influence on the mixture formed between the air and fuel or the already formed combustible mixture. In this way a substantial change in the fuel mixture ratios is achieved, with, when utilizing high energy, a considerably reduced extent of pollutants in the exhaust gas which flows to the outer atmosphere.

Thus, it is a further object of the present invention to considerably simplify and considerably increase the efficiency of the operations in connection with preparation of the combustible mixture, by utilizing the exhaust gas.

In addition to being able to operate a Wankel engine with Diesel fuel, according to the invention, it is also possible to operate a Wankel engine with any desired other fuel.

It is also an object of the present invention to provide an engine construction operating method according to which it becomes possible to efficiently start an engine under cold conditions, as by arranging a spark plug at the compression chamber. In the region of this spark plug it is of advantage to provide a supply of fuel as by way of fuel injection nozzles. It has proved to be particularly desirable to provide three injection nozzles at the compression chamber.

BRIEF DESCRIPTION OF DRAWINGS

Five different embodiments for achieving the results of the present invention are illustrated in the accompanying drawings which form part of this application and in which:

FIG. 1 is a sectional illustration of an engine according to the invention shown in two different operating positions of the piston with charging by way of exhaust gas with a closed intake chamber;

FIG. 2 is a schematic sectional elevation of a special embodiment of a structure for supplying fuel to the supply system;

FIG. 3 is a schematic partly sectional elevation of an exhaust gas collector and fresh-air supply and air compression system operated by reaction with an exhaust gas stream;

FIG. 3a shows the charging reactor of FIG. 3 connected with a Wankel engine having also a carburetor supply unit;

FIG. 3b shows in section an air supply and charging reactor driven by a mixture of exhaust gas and air;

FIG. 4 shows a Wankel engine with a further charging reactor operated by exhaust gas and a recirculated charging of exhaust gas with simultaneous fuel atomization in the expansion chamber while the intake chamber is closed.

DESCRIPTION OF PREFERRED EMBODIMENTS

Figure 5:
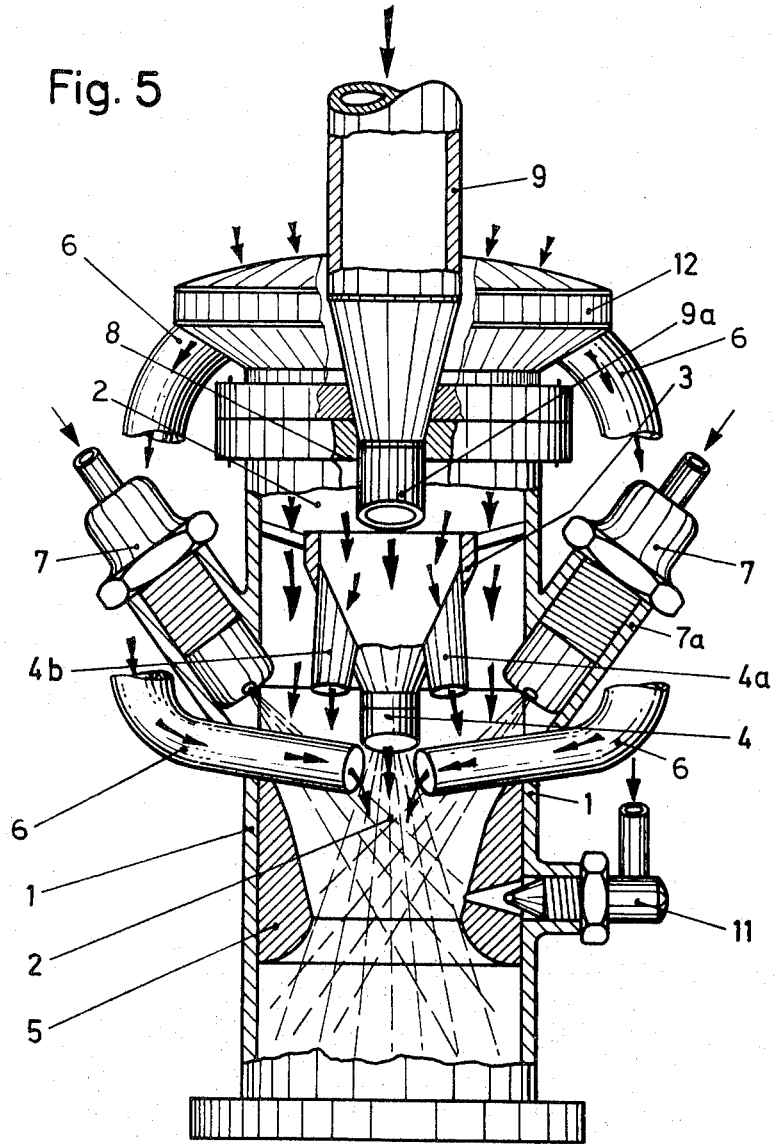
FIG. 5 is a sectional illustration at an enlarged scale of the structure of FIG. 3b, FIG. 5 showing an air-supply and charging reactor operated by exhaust gas and a mixture of exhaust gas and air, with the structure operating also as a reactor for preparing a fuel mixture.

According to FIGS. 1 and 4, there is situated at the region of the exhaust gas discharge chamber 32, approximately 10°–40° in advance of the actual exhaust gas outlet 33, a discharge duct 32a for part of the gas, for the purpose of conveying away exhaust gas in order to provide for preparation of the fuel mixture. In order to increase compression in the intake chamber 38 almost up to the expansion region, there is provided approximately 30° after the supply port 35 an additional supply port 37 in order to increase compression with exhaust gases or with a mixture of air and exhaust gas at the intake chamber 38, with simultaneous preparation of the fuel mixture. The discharge passage 32a is connected with the supply passage 37 by way of an overflow duct 9. The charging and preparation of the fuel mixture takes place in the intake chamber 38 which is already closed and filled with air or a fuel air mixture or a mixture of exhaust gas and air. The overflow duct 9 is provided with non-return valves R. The discharge passage 32a and the supply passage 37 are controlled with respect to the amount of fluids flowing therethrough by way of the rotary piston 34.

According to FIG. 1, when the piston 34 is in the dot-dash line position the suction port 35 has already been closed and the discharge passage 32a is opened to the overflow of exhaust gas by way of the passage 37 into the intake chamber 38. The supply passage 37, according to FIG. 1, can be provided with three holders 7a in which injection nozzles 7 are mounted, which at the beginning of each compression period inject one after the other fuel into the intake chamber 38 which is closed and supplied with fresh air, while simultaneous charging with exhaust gas takes place.

Upon movement of the piston 34 further in a clockwise direction, as viewed in FIG. 1, the piston 34 assumes the solid-line position shown in FIG. 1, so that the exhaust gases now expand into the discharge or exhaust passage 33, the piston now begins its period of charging with fresh air and is free from the influence of exhaust gas until completion of this filling period. By way of an accurately metered addition of a part of the exhaust gas through proper size-selection of interchangeable nozzles 9a, at the entrance into the duct 9 for part of the exhaust gas, it is possible to achieve in the intake chamber 38 compressions which are sufficient in order to operate the engine with Diesel fuel.

The supply unit of FIG. 2, which may be situated just beneath the air filter shown at the top of FIG. 1 between this air filter and the supply port 35, is provided around its housing 1 with three injection nozzles which operate one after the other at each filling period during which fuel is supplied. It will be noted that there are three such operating cycles during each revolution of the piston 34. Thus during each revolution of the piston 34 the three injection nozzles will operate respectively in succession. In addition there is an injection nozzle 7 with a spark plug Z at the expansion chamber EX, and in this case also instead of a single injection nozzle it is possible to provide three injection nozzles at the expansion chamber.

If exhaust gases are supplied for increasing compression when the intake chamber 38 is closed, then the supplied exhaust gas serves only for increasing the compression ratio and acts primarily as a compact mass or cushion for adding to the compression in the chamber without any undesirable influence on the fuel mixture or combustion process, in the case where exhaust gases are supplied into an intake chamber which is already under compression.

It is to be noted that the expansion chamber EX is distinct from the intake chamber 38. Thus, while these chambers may communicate with each other and form, in effect, a common chamber in certain angular positions of the rotary piston 34, as shown in FIG. 1, for example, nevertheless at certain angular positions a tip of the rotary piston 34 will separate these chambers from each other. For example in FIG. 3a the intake chamber 38 and expansion chamber EX are shown separated from each other by a tip of the piston.

According to FIG. 2, in order to aid during starting there is a fuel supply 11 by way of which during cold starts an easily combustible fuel is supplied.

According to FIGS. 3 and 3a, there is an exhaust gas collector 15 which operatas as a charging reactor for increasing compression and preparing the fuel mixture. In this case the exhaust gas collector is divided into two parts, namely an exhaust gas receiving chamber 16 and a fresh air receiving chamber 17. Both of these sections are separated by a thick partition wall 18. From the exhaust gas part 16 there is branched through the intermediate partition wall 18 the exhaust gas supply duct 9 with the nozzle 9a, so that the exhaust gas is supplied in this way to the preparation chamber 2 for the fuel in the supply system. The exhaust gas conduit 9, 9a is incorporated into the air-supply duct 17a in such a way that the supplied air can flow unhindered to the chamber 2 from the air filter F through the air-supply passage 17 around the exhaust gas supply duct 9. The unit which is shown in FIG. 3b for supplying the combustible mixture is to be considered as situated at the location of the unit 25 of FIG. 3a and operates as a charging reactor to be used interchangeably with unit 25. In the case of FIG. 3b there is an additional filter F2 having the air-supply conduits 6 which are connected as illustrated by dotted lines to the ends of the conduits 6 which communicate with the interior of the preparation chamber 2.

According to FIGS. 3 and 3a there are special fresh-air supply ducts A1, A2 shown at the unit 25 in FIG. 3a, these ducts being supplied, for example, by a separate filter such as the filter F2 shown in FIG. 3b. These additional fresh-air supplies are provided in the supply system 17-17b, which is compelled by the part of the exhaust gas stream flowing through the exhaust gas duct 9 to increase the supply of fresh air in accordance with an injector type of operating principle, so that the exhaust gas which is supplied is very strongly thinned or diluted with fresh air at the preparation chamber 2, according to FIG. 3b, achieving a supply at high speed of a mixture of fresh air and exhaust gas. The increased flow resulting from the exhaust gas brings about also a strong increase in the secondary air flow in the fresh-air supply 17, 17b, so that by way of this exhaust gas supply and air compression the charge with increased compression with a fresh-air and exhaust gas mixture in itself is sufficient to enable a Wankel engine to operate with Diesel fuel, with the part of the supply formed by the fresh-air being in this case higher than the part of the exhaust gas used for fresh-air supply and compression for charging purposes. It is also possible to provide several air-supply conduits A1, A2.

Instead of the arrangement shown in FIG. 3a for mixing the fluids at the supply unit 25, it is also possible to provide the charging and fuel-preparation reactor of FIG. 3b which can replace the unit 25 shown in FIG. 3a. The construction operation of the unit of FIG. 3b is described in greater detail in connection with FIG. 5. According to FIG. 3b, there are provided at the outer housing 1 three or more fuel-supply devices 7 which operate particularly to supply fuel at every supply period of each operating cycle. Moreover, the mechanical charging reactor 3 and further air-supply conduits 6 are provided, which communicate with a separate special air filter F2 for independent supply of fresh-air and compression of air as a result of the high speed of the flowing exhaust gas-air mixture, with simultaneous preparation of fuel for the intake chamber 38. To achieve optimum addition of exhaust gas for charging and preparation of the fuel there is provided according to FIG. 3a at the exhaust gas outlet 23 an automatically operating exhaust gas control valve 22 carried by an exchangeable intermediate part 22a, this part maintaining a predetermined exhaust gas pressure in the chamber 16 at every rotating speed of the engine, so that even with low speeds of rotation of the engine an optimal amount of exhaust gas is assured. It is also possible according to FIG. 3 to provide an automatically operating exhaust gas pressure control valve 22b in the exhaust gas chamber 16. These valves 22b and 22 of FIG. 3 and FIG. 3a are swingably mounted along their upper edges so that in response to the flow of exhaust gas they will swing, for example, to the positions illustrated in FIGS. 3 and 3a in order to maintain a given pressure in the gas, the swinging of the valves being in response only to the movement of the gas itself.

The basis for all the above illustrated embodiments is that the fuel which is supplied, even fuel supplied by injection nozzles, must be atomized, or in other words broken up into fine particles, by a stream of exhaust gas or a mixture of exhaust gas and air which has a higher speed of movement than the speed of flow of the stream of air which is supplied.

While the above valves 22 and 22b operate to resist the flow of gas only by their weight, it is also possible to provide springs which additionally yieldably resist the flow, so as to obtain an automatic regulation of the exhaust gas pressure so that with extremely low speeds of revolution a charging by way of the exhaust gas is still possible.

The operation of FIGS. 3, 3a and 3b is as follows:

The exhaust gas which enters into the duct 9 operates because of its high speed of flow and because of the vibratory movement of the hot air in the exhaust to such fresh air out of the fresh-air supply duct A1, so as to deliver this fresh air together with the exhaust gas into the interior of the duct 9 thus in the initial part of the operation serving to replace a high percent of the exhaust gas with fresh air. Instead of a single fresh-air supply duct A1, it is also possible to provide a pair of such fresh air ducts leading from the filter F into the duct 9. During its continued flow the mixture of exhaust gas and air provides a second stage of fresh-air supply by way of a further fresh-air supply duct A2, this duct being acted upon by the suction resulting from the issue of the mixture of exhaust gas and air from the nozzle 9a so as to suck the air entering through the filter F flowing along the exterior of the duct 9 in the chamber 17b. Also in this case instead of a single duct A2 it is possible to provide a pair of such ducts. Both of these air supplies by way of the exhaust gas are carried out in accordance with injector and compression principles and the best possible air supply by way of the ducts A1 and A2 is brought about by way of the manner in which the ducts A1 and A2 are connected with the duct 9, 9a.

This high speed of supply of fresh air brought about by way of the exhaust gas through the tubes A1 and A2 brings about in the air supply chambers 17, 17b a high speed of flow of the secondary air stream which as a result of the pressure head action and, in fact the Venturi action resulting from the tapered configuration at the nozzle 9a and the duct 9 as well as at the duct A2 provides a substantially higher increase in speed so that by way of the illustrated arrangement there is already a charge to the intake chamber 38 sufficient to increase the compression so as to be capable of operating any Wankel engine of any size with Diesel fuel.

The charging by way of the exhaust gas takes place in this case in three stages by way of the ducts A1, A2 and by way of the increase in flow of fresh air resulting from the suction and pressure head action. The part of the exhaust gas which is supplied to the unit 15 reduces itself in this way to an extremely small fraction which is necessary for an effective power of the engine. The efficiency and power are increased even further to a great extent if the structure of FIG. 3b replaces that of FIG. 3a so as to be used instead of the unit 25 shown in FIG. 3a. In carrying out the replacement of unit 25 of FIG. 3a with the unit of FIG. 3b, the mixture of fresh air and exhaust gas flowing from the nozzle 9a and the duct A2 as well as the fresh air supply 17b delivers itself at a high speed to the reactor 3 of FIG. 3b to provide a further fresh air supply and a further compression, this action taking place in two further stages, namely, once as a result of the pressure head compression at the reactor 3 and in the second place by way of a further fresh air supply through the ducts 6 which receive their air through the special fresh air filter F2. The flow and charging pressure are still further increased substantially by way of the reactor of FIG. 3b so that a sufficient charge with simultaneous preparation of the fuel mixture can take place with a Wankel engine so that it can use Diesel fuel.

In the expansion chamber EX there is a spark plug G in the form of a glow plug as well as an additional spark plug Z which operates with a spark gap. During cold starts it is preferable to actuate the glow plug G in a known way. After the operation has started the Diesel fuel which is supplied, after it has been treated with the hot air vibrations and high speed of flow renders it possible to ignite the expansion mixture with the gap spark plug Z with a high degree of advance ignition. According to FIG. 3a there is in the expansion chamber region EX, beside the glow plug G, an injection nozzle 7. This arrangement can be replaced by three holders 7a in which there are three injection nozzles 7, so that during each of the successive expansion phases of the three operating cycles which take place at each revolution of the piston 34, one of the injection nozzles delivers fuel to the expansion chamber in the same way as with the embodiment of FIG. 4.

Referring now to FIG. 4, the air supply and charging utilizing exhaust gas as an energy source is illustrated to be the same as in FIGS. 3 and 3a, except that in this case the unit 25 has the construction of a fourth fresh air charging stage. In this unit 25 of FIG. 4 there are a pair of further fresh-air supply ducts A3 communicating with a special air filter F2 and operating by way of the flow of air exhaust gas from the supply conduits 17b, 9a and A2 so as to achieve a further fresh air charge. There takes place, therefore, in this case a high speed of flow of the charge which results in an extremely high compression increase at least up to double the compression value of a conventional Wankel engine with its present compression ratio of 9:1. Also in this way it is possible to operate Wankel engines perfectly with Diesel fuel.

According to FIG. 4 it is possible to operate a Wankel engine with a double charge which may be considered as a reverse charge with simultaneous preparation of the fuel mixture. For this purpose in order to treat the fuel and provide the opposing charge there are a pair of further conduits or ducts, namely, one in the region of the exhaust gas chamber 32 and the other in the region of the expansion chamber EX, somewhat as shown in FIG. 1 except that in this case the exhaust gas duct 9 communicates with the expansion chamber EX. The exhaust gas port 32a is in this case arranged approximately 40° from the primary exhaust gas port 33 and in such a way that the piston 34 with its piston tip 1 uncovers the exhaust gas port 32a to provide for flow of the exhaust gas to the supply port 37 when the piston tip 2 has closed the supply port 35.

Between the duct 9 and the supply port 37 there is an automatically operating pressure compensating valve 40 which under the influence of a compression spring 41 so that it can be adjusted to provide the required flow of exhaust gas to the chamber 38. A further control of the amount of supply of exhaust gas to the chamber 38 takes place by a proper selection of the size of the exchangeable nozzle 9a. At the position of the piston 34 shown in solid lines in FIG. 4 there is a flow of high pressure hot exhaust gas through the supply duct 9 and the valve 40, as well as through the nozzle 9a and the port 37 to the intake chamber 38 with simultaneous injection from one of the three injection nozzles 7 arranged around the supply port 37, thus supplying fuel to the intake chamber 38, this fuel being atomized or broken up to a very great degree into very fine particles as a result of the action of the high rate of flow of the exhaust gas with its hot air vibrations. Three holders 7a are arranged around the supply port 37 carrying three injection nozzles or three other devices for supplying fuel.

Thus, when the piston 34 reaches the position shown in solid lines in FIG. 4, there takes place an exhaust gas supply and treatment of fuel at the beginning of the compression phase with the supply port 35 closed. During this phase of the operation the flow of exhaust gas is still extremely high so that a high charge of exhaust gas is possible.

If the exhaust gas port 32a is replaced by a port 32a-2, as shown in dot-dash lines in FIG. 4, then the supply of exhaust gas to the intake chamber 38 takes place at a substantially later time during each operating cycle, so that the supply of fuel and treatment of the fuel with the exhaust gas is carried out almost when the end of the compression phase of the operating cycle has occurred in the expansion chamber EX.

Thus, when the piston 34 has its tip 1 situated as shown in FIG. 4 to open the port 32a, the exhaust gas flows to the intake chamber 38 while the tip 2 of the piston 34 has just closed the supply port 35. With this position the supply of fuel takes place with simultaneous atomization by way of the exhaust gas. Upon movement of the piston in a clockwise direction, as viewed in FIG. 4, to assume the dot-dash line position, so that the tips 1 and 2 have reached the position 1a and 2a, the supply of fuel to the expansion chamber EX takes place. In order to achieve a proper treatment of the fuel with the exhaust gas the exhaust gas port 32a must be replaced by the exhaust gas port 32a-2. In other words, if it is desired to operate with supply of fuel when the piston 34 has the solid line position in FIG. 4, the port 32a will be used whereas if it is desired to operate with a supply of fuel when the piston 34 has the dot-dash line position in FIG. 4, it is necessary to use instead of the port 32a the port 32a-2.

The exhaust gas compensating spring valve assembly 40-42 operates as follows:

During flow of exhaust gas through the duct 9 the valve 40 is acted upon by the high exhaust gas pressure and part of the exhaust gas will thus flow through the port 37 into the intake chamber 38 with simultaneous treatment of fuel. When the tip 1 of the piston reaches the exhaust gas outlet 33, there is no further supply of exhaust gas to the intake chamber since the spring 41 at this time closes the valve in a pressure and dust-tight manner, this spring 41 being situated in the housing 42, so that the supply of exhaust gas is regulated.

Also, it is possible to arrange the exhaust gas outlets 32a and 32a-2 in such a way with respect to each other that an ignition takes place with the supply of exhaust gas with its vibrating hot air and with simultaneous treatment of fuel by way of the exhaust gas. During cold starts the glow plug G, which is provided as illustrated in FIG. 4, is operated in a known way. Also, it is possible without the addition of exhaust gas to supply fuel by way of the port 37 to the intake chamber 38, but the efficiency with this type of operation is less than when exhaust gas is supplied to treat the fuel.

The operation of FIG. 4 is as follows:

The charging reactor shown at the top of FIG. 4 supplies fresh air under high compression as a result of the use of the exhaust gas as an energy source, with the exhaust gas remaining only as a small fraction of the compressed fresh air which is supplied. This fresh air which is thus supplied and compressed by the exhaust gas flows now with a higher speed as a mixture of fresh air and exhaust gas to the intake chamber 38, so that the intake chamber contains at least from twice to three times the charge which would be provided only by the vacuum in the filling chamber. In the expansion chamber EX there takes place the treatment of the fuel by the exhaust gas. For optimal operating conditions there is also provided in this case an automatically operating exhaust gas pressure regulating valve 22.

All of the above described constructions can be utilized either in their entirety or partially.

According to FIG. 5, which is an enlarged illustration of the structure shown in FIG. 3b, there is a supply of a combustible mixture and treatment thereof which also can be used with piston engines in which the pistons reciprocate.

According to FIG. 5 the fuel is treated in the fuel-mixture treating chamber 2 provided with a Venturi-type of accelerator with simultaneous air compression and fuel-mixture treatment taking place.

According to FIG. 5 in the chamber 2 there is an air-supply and air compression reactor 3 having a plurality of supply ducts 4a, 4b, distributed about a central supply duct 4, so that in addition to the central duct 4 there are a plurality of branched ducts 4a, 4b, and, of course, instead of only two branch ducts 4a, 4b it is possible to provide additional branch ducts.

The reactor 3 is constructed in such a way that it operates to atomize or finely divide the fuel and in addition operates to accelerate the flow of fresh air, so that it operates as a charging compressor utilizing the hot exhaust gas which flows at high speed as an energy source. Around the housing 1 of the treatment chamber 2 there are from three to six injection nozzles or other fuel supply devices uniformly distributed at equal distances from each other, and these injection nozzles or the like serve in a given sequence to supply fuel to the mixing chamber 2. At the mixing chamber inlet 8 there is the supply duct 9 with its interchangeable nozzle 9a. Through the supply duct 9 it is possible to supply hot exhaust gas at high pressure as well as a mixture of exhaust gas and fresh air (see FIGS. 3a, 3b). The supply duct 9, 9a is arranged in such a way with respect to the reactor 3 that the reactor 3 is operated to supply a large amount of fresh air with simultaneous air compression and treatment of fuel by way of the mixture of exhaust gas and air which is delivered. According to FIG. 5 there are further fresh-air supply ducts 6 which communicate with an air supply filter 12 and which are operated by the action of the jet issuing from the nozzle 4 to supply additional fresh air with simultaneous treatment of fuel. By way of the nozzle 9a the amount of exhaust gas which is supplied is regulated to achieve the optimum conditions for combustion of the mixture. The supply unit 11 according to FIG. 5 serves to assist in starting by supplying an easily combustible fuel particularly during operation with Diesel oil and other fuels which have a relatively heavy weight.

The operation of FIG. 5 is as follows:

By way of the supply duct 9 hot exhaust gas at high pressure is delivered, or as shown in FIGS. 3a and 3b a mixture of fresh air and exhaust gas at high speed of flow is delivered to the treatment chamber 2, as well as to the reactor 3. The reactor 3 divides up the delivered fresh air and exhaust gas by way of the outlets 4, 4a, 4b, thus distributing the supplied exhaust gas and fresh air to all sides, or in other words in all directions, with an even higher speed of flow, and in addition there is the supply of further fresh air from the filter 12 to achieve an even greater speed of flow. The fresh-air supply ducts 6 are arranged with respect to the primary flow nozzle 4 in such a way that a further fresh air supply with simultaneous even higher speeds of flow takes place, so that the supplied fuel is even further divided to an even finer extent into small fine particles and charged to the intake chamber of the internal combustion engine with a highly compressed combustible air mixture. Instead of a pair of ducts 6 it is possible to provide three or four supply ducts 6.

According to these embodiments the internal combustion engine, particularly a Wankel engine, can be operated permanently with Diesel fuel.

The above-described structure of the invention demonstrates that it is possible to charge an internal combustion engine utilizing exhaust gas as an energy source, in a simple way, instead of utilizing expensive and complicated compressors for charging the internal combustion engine.

The embodiment of FIG. 5 also can be combined with any internal combustion engine.

What is claimed is:

1. In a rotary type of Wankel engine, a housing having an exhaust chamber provided with a primary exhaust port as well as an exhaust port for part of the exhaust gas situated 10°–40° in advance of the primary exhaust port, said housing having also an intake chamber provided with a primary supply port and approximately 20° subsequent to the primary supply port a further supply port capable of delivering gas all the way up to an expansion chamber, the auxiliary exhaust and auxiliary supply ports being interconnected by a duct and a rotary piston being situated in the housing for controlling the exhaust and supply flows to achieve an optimal amount of exhaust gas and fresh air for fuel atomization with simultaneous charging of the intake chamber, a fuel supply mixing chamber being provided and an exhaust gas collection means being provided for special supply of fresh air and exhaust gas, to charge and treat a fuel mixture and control the flow of exhaust gas to the outer atmosphere, the said exhaust gas collection means being divided into a pair of chambers separated by a thick partition wall, and having an air supply duct and an exhaust supply duct with the exhaust gas duct functioning to supply air as well as compress and charge the air, and in addition to treat a fuel mixture in said fuel supply mixing chamber which receives gas from the exhaust gas collecting means, the latter having a valve means for automatically regulating the flow of exhaust gas to the outer atmosphere, the latter automatic valve means being situated at an outlet to the outer atmosphere and operating to automatically control the pressure of the exhaust gas to maintain an optimum amount of exhaust gas for charging and fuel treating purposes.

2. The combination of claim 1 and wherein the gas collecting means has a pair of fresh-air supply duct means arranged with respect to the exhaust gas duct for providing that the exhaust gas flowing at high speed and having vibrating hot air therein functions according to the injector principle to suck fresh air at high speed into the exhaust gas collecting means, so that the exhaust gas is diluted strongly and thinned by way of the fresh air before reaching the fuel treating chamber.

3. The combination of claim 2 and wherein a further fresh-air supply duct is arranged to supply additional air to the fuel treating chamber, an additional air filter being provided for the additional air supply duct so that a further supply of fresh air and further charging can take place by way of the stream of exhaust gas.

* * * * *